US009664538B2

(12) United States Patent
Hoyt et al.

(10) Patent No.: US 9,664,538 B2
(45) Date of Patent: May 30, 2017

(54) ROTATIONAL SENSOR AND METHODS THEREFOR

(75) Inventors: Berwyn Lee Hoyt, Christchurch (NZ); Aaron Michael Robinson, Auckland (NZ)

(73) Assignee: Airway Limited, Auckland (NZ)

(*) Notice: Subject to any disclaimer, the term of this patent is extended or adjusted under 35 U.S.C. 154(b) by 122 days.

(21) Appl. No.: 14/355,540

(22) PCT Filed: Oct. 31, 2011

(86) PCT No.: PCT/NZ2011/000232
§ 371 (c)(1),
(2), (4) Date: Apr. 30, 2014

(87) PCT Pub. No.: WO2013/066194
PCT Pub. Date: May 10, 2013

(65) Prior Publication Data
US 2014/0264037 A1    Sep. 18, 2014

(51) Int. Cl.
*G01J 5/02* (2006.01)
*G01D 5/347* (2006.01)
*G01D 5/34* (2006.01)
*G09B 23/28* (2006.01)
*G01D 5/26* (2006.01)
*G01D 5/58* (2006.01)

(52) U.S. Cl.
CPC ........... *G01D 5/3473* (2013.01); *G01D 5/268* (2013.01); *G01D 5/34* (2013.01); *G01D 5/34776* (2013.01); *G01D 5/34792* (2013.01); *G01D 5/58* (2013.01); *G09B 23/285* (2013.01)

(58) Field of Classification Search
CPC ............................... G01D 5/3473; G01D 5/34
USPC .......................................................... 250/349
See application file for complete search history.

(56) References Cited

U.S. PATENT DOCUMENTS 4,506,745 A * 3/1985 Bjor ................................ 175/45
4,928,009 A * 5/1990 Ikebe et al. .............. 250/231.13
6,483,104 B1 * 11/2002 Benz et al. .............. 250/231.13

FOREIGN PATENT DOCUMENTS

JP    2006105920        4/2006
JP    2006105920 A  *   4/2006
WO   2011021947        2/2011

* cited by examiner

*Primary Examiner* — Kiho Kim
(74) *Attorney, Agent, or Firm* — Lowe Graham Jones PLLC (57) ABSTRACT

The invention is a rotational sensor to sense an object's angle and methods to analyze the sensor output. The sensor has a first emitting source, to either emit onto, or from the object, a first receiving sensor, to receive emissions from the first emitting source, either directly or indirectly, the emissions received dependent on said angle, first receiving sensor outputting a first signal a course measurement of the angle. Also present is a second emitting source, to emit onto, or from the object and a second receiving sensor, to receive emissions from the second emitting source, either directly or indirectly the emissions received again dependent on said angle, second receiving sensor outputting a second signal, as a fine measurement of the angle. A method of use of the sensor is disclosed together with a method of combining the fine and course measurements to output a signal with zero error.

25 Claims, 4 Drawing Sheets

ROTATIONAL SENSOR AND METHODS THEREFOR

PRIORITY CLAIM

This application claims priority to PCT Application Serial No. PCT/NZ2011/000232 filed on Oct. 31, 2011, which is hereby incorporated by reference.

FIELD OF THE INVENTION

The present invention relates to rotational sensors. More particularly, the invention relates to a rotational sensor that may be used in, for example but not limited to, a training aid which simulates movement of a virtual endoscope in a virtual human or animal body passageway or cavity, and which preferably provides for improved realism and/or accuracy in the simulated path in the virtual space when compared to the movements of the user.

BACKGROUND OF THE INVENTION

Endoscopy is a minimally invasive diagnostic medical procedure used to view interior parts of the body, such as the interior or exterior surfaces of organs, joints or cavities. It enables physicians to peer through the body's passageways. An endoscope typically uses two fibre optic lines. The first, a "light fibre", carries light to the region of the body to be viewed. The second, an "image fibre", carries the image of the region back to the physician's viewing lens or, where desired, to a camera so that the image may be displayed on a screen.

There are also other endoscopes that rely on camera technology at the end of the scope, and are sometimes referred to as are videoendoscopes. These have small digital cameras rather than optical fibre bundles. The video bronchoscope has a built in camera which is transmitted to a viewing screen.

The portion of the endoscope inserted into the body may be sheathed in a rigid or flexible tube, depending upon the medical procedure. One or more lenses may be provided at the end of the endoscope to enhance image capture and/or illumination of the body region. Ports may be provided to for administering drugs, suction, irrigation, and introducing small instruments.

For applications such as bronchoscopy, the tube must be sufficiently flexible to allow it to be accommodated in body passageways without undue discomfort or injury to patients under examination, but must be rigid enough to cause it to move through passageways without bunching up. Physicians operate an endoscope by controlling how far the tube is inserted in the body cavity, the rotation of the tube and also the bending of the tube along its length.

The tips of endoscopes may be selectively bendable in at least one direction so that the tip may be pointed in a desired direction. Through control of the bend of the tip and rotation of the endoscope tube, the tip of the endoscope may pass through bends in the interior passageways without the tip directly impinging on the walls. This also facilitates the desired path to be selected at a junction, e.g. where the trachea meets the left and right bronchi.

A physician may practice procedures on a patient but this is not desired, at least during early stages of training as inexperienced operators may injure a patient or damage the equipment (endoscopes are fragile, complex and expensive to replace).

Physical models of passageways or "airway mannequins" may be used in place of patients but these suffer from difficulty in accurately mimicking the contour and surface characteristics of the passageways. It is generally necessary to use genuine endoscopes with mannequins and so they do not prevent the endoscopes being damaged and the associated cost. Also, they remove endoscopes from clinical use and raise sterility concerns. The mannequins themselves are expensive and limited in that each mannequin is modelled on a particular type of patient (e.g. paediatric versus adult). Thus, it is necessary to obtain a variety of mannequins or for physicians to practice in an environment which differs from that of a patient to be operated on. To overcome these problems, simulators have been created which avoid the use of an actual endoscope. For example simulators of varying types are shown in GB-A-2,252,656, WO-A-96/30885, WO 2009/008750 and the simulation software High Techsplantations' Telios. The physically based simulators generally rely on use of an endoscope, or a close facsimile thereof, which is slid into an aperture in a simulation box. Within the box are sensors to detect rotation and movement of the endoscope. These then feed the sensor outputs via a cable or wireless connection to a computer. The computer then translates these sensor outputs into movements on screen which the operator can then use to control the endoscope and practice.

Physical models of passageways or "airway mannequins" may be used in place of patients but these suffer from difficulty in accurately mimicking the contour and surface characteristics of the passageways. It is generally necessary to use genuine endoscopes with mannequins and so they do not prevent the endoscopes being damaged and the associated cost. Also, they remove endoscopes from clinical use and raise sterility concerns. The mannequins themselves are expensive and limited in that each mannequin is modelled on a particular type of patient (e.g. paediatric versus adult). Thus, it is necessary to obtain a variety of mannequins or for physicians to practice in an environment which differs from that of a patient to be operated on.

To overcome these problems, simulators have been created which avoid the use of an actual endoscope. For example simulators of varying types are shown in GB-A-2, 252,656, WO-A-96/30885, WO 2009/008750 and the simulation software High Techsplantations' Telios. The physically based simulators generally rely on use of an endoscope, or a close facsimile thereof, which is slid into an aperture in a simulation box. Within the box are sensors to detect rotation and movement of the endoscope. These then feed the sensor outputs via a cable or wireless connection to a computer. The computer then translates these sensor outputs into movements on screen which the operator can then use to control the endoscope and practice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

OBJECTS OF THE INVENTION

It is an object of the present invention to provide an improved rotational sensor which may be able to overcome or at least ameliorate the above problems or at least will provide the public with a useful choice.

Further objects of the invention will become apparent from the following description.

SUMMARY OF THE INVENTION

It is an object of the present invention to provide an improved rotational sensor which may be able to overcome or at least ameliorate the above problems or at least will provide the public with a useful choice.

Further objects of the invention will become apparent from the following description.

Preferred and alternative examples of the present invention are described in detail below with reference to the following drawings:

In a first aspect the present invention may be said to broadly consist in a rotational sensor to sense an angle of an object located nearby said sensor, said sensor comprising or including,
  a. At least one first emitting source, to either emit onto, or from said object,
  b. At least one first receiving sensor, to receive emissions from said at least one first emitting source, either directly or indirectly, said emissions received dependent on said angle, said at least one first receiving sensor outputting a first signal, proportionate to said emissions, as a course measurement of said angle,
  c. At least one second emitting source, to emit onto, or from said object,
  d. At least one second receiving sensor, to receive emissions from said at least one second emitting source, either directly or indirectly, said emissions received dependent on said angle, said at least one second receiving sensor outputting a second signal, proportionate to said emissions, as a fine measurement of said angle, Wherein said first signal and said second signal are capable of being combined to determine said angle.

Preferably said at least one first emitting source and said at least one first receiving sensor measure absolute rotation of said object.

Preferably said at least one second emitting source, and said at least one second receiving sensor measure relative rotation of said object.

Preferably there is a plurality of said first emitting sources.

Preferably said plurality of first emitting sources is arranged in an array about said object.

Preferably there is a plurality of said first receiving sensors.

Preferably said plurality of first receiving sensors is arranged in an array about said object.

Preferably said array is a circular array, through which said object can pass.

Preferably each said first receiving sensor is tuned to its first emitting source, or vice versa.

Preferably said rotational sensor has a course measurement resolution of 360 degrees divided by twice the number of said first receiving sensors.

Preferably there are between two and fifteen first receiving sensors.

Preferably there are seven said first emitting sources.

Preferably there is a one to one matching of a said first emitting source to a said first receiving sensor.

Preferably the output of said first and second light receiving sensors is analysed by the method as herein described.

Preferably said object is an elongate object.

Preferably said object has a substantially constant external shape.

Preferably said object is circular in cross-section.

Preferably said sensor can detect said object having a first emissive property over one surface arc of said object, and a second emissive property over a remainder surface arc of said object, because of said at least one first emitting source, said first and second emissive properties detectable by said at least one first receiving sensor.

Preferably said first emissive property over said one surface arc runs as a stripe of said first emissive property in a longitudinal direction along said object.

Preferably said stripe is continuous over said one surface arc and has substantially the same beginning and end angle along said object.

Preferably said stripe of said first emissive property is over substantially a 90 degree arc of said surface.

Preferably said first receiving sensor receives light from said first emitting source, either indirectly as a reflection or directly as an emission.

Preferably said second receiving sensor receives light from said second emitting source, either indirectly as a reflection or directly as an emission.

Preferably said first emitting source illuminates at least part of a surface of said object and said first receiving source receives said illumination as a reflection from said surface.

Preferably said second emitting source illuminates at least part of a surface of said object and said second receiving source receives said illumination as a reflection from said surface.

Preferably said at least one emitting source is a light emitting diode.

Preferably said at least one first emitting source emits in the infra-red spectrum.

Preferably said at least one first receiving sensor is a photo-transistor.

Preferably said at least one first receiving sensor receives in the infra-red spectrum.

Preferably said at least one second emitting source is a laser based light emitting source.

Preferably said at least one second receiving sensor has a resolution in excess of 1,000 dots per inch.

Preferably said at least one second receiving sensor has a resolution of 2,000 dots per inch.

Preferably said object has an outward presenting or visible surface comprised primarily of two colors, one color over one arc of said surface as said stripe, and the other color over the remainder arc of said surface.

Preferably said stripe is white and said other color is black.

Preferably said sensor has at least one connector to transmit said signals.

Preferably said connector is an electrical connector.

According to a further aspect the present invention consists in a rotational sensor to sense a rotation of an object located nearby said sensor, said sensor comprising or including, At least one first light emitting source, to illuminate at least part of a surface of said object, At least one first light receiving sensor, to receive light from said at least one light emitting source, at least some of which is reflected from said object when in front of said light emitting source, wherein the output of said at least first one light receiving sensor is dependent on a change in color of said object, At least one second light emitting source, to illuminate at least part of a surface of said object, At least one second light receiving sensor to receive at least light from said at least one second light emitting source, Wherein said first light receiving sensor receives and outputs a signal proportionate to a first measurement of an angle of said object, and said second light receiving sensor receives and outputs a signal proportionate to a second measurement of an angle of said object.

Preferably said first measurement is a course measure of the rotation of said object.

Preferably said second measurement is a fine measure of the rotation of said object.

Preferably said at least one first light emitting source and said at least one first light receiving sensor measure absolute rotation of said object.

Preferably said at least one second light emitting source, and said at least one second light emitting sensor measure relative rotation of said object.

Preferably said at least one light emitting source is a light emitting diode.

Preferably said at least one first light emitting source emits in the infra-red spectrum.

Preferably there is a plurality of said first light emitting sources.

Preferably said plurality of first light emitting sources is arranged in an array about said object.

Preferably said array is a circular array.

Preferably said at least one first light receiving sensor is a photo-transistor.

Preferably said at least one first light receiving sensor receives in the infra-red spectrum.

Preferably there is a plurality of said first light receiving sensors.

Preferably said plurality of first light receiving sensors is arranged in an array about said object.

Preferably said array is a circular array.

Preferably there is a one to one matching of a said first light emitting source to a said first light receiving sensor.

Preferably each said first light receiving sensor is tuned to its first light emitting source.

Preferably said rotational sensor has a course resolution of 360 degrees divided by twice the number of said first light receiving sensors.

Preferably there are between two and fifteen first light receiving sensors.

Preferably there are seven said first light emitting sources and seven said first light receiving sensors.

Preferably said at least one second light emitting source is a laser based light emitting source.

Preferably said at least one second light receiving sensor has a resolution in excess of 1,000 dots per inch.

Preferably said at least one second light receiving sensor has a resolution of 2,000 dots per inch.

Preferably the output of said first and second light receiving sensors is analysed by the method as herein described.

Preferably said object is an elongate object.

Preferably said object has a substantially constant external shape.

Preferably said object is circular in cross-section.

Preferably said object has an outward presenting or visible surface comprised primarily of two colors, one color over one arc of said surface, and the other color over the remainder arc of said surface.

Preferably said one color as an arc runs as a stripe in a longitudinal direction on said object.

Preferably said stripe is continuous over said surface and has substantially the same beginning and end angle along said object.

Preferably said one color is over substantially a 90 degree arc of said surface.

In another aspect the present invention consists in a method of sensing an angle of an object comprising or including the steps of, a. Providing at least one first emitting source, to either emit onto, or from said object, b. Providing at least one first receiving sensor, to receive emissions from said at least one first emitting source, either directly or indirectly, said emissions received dependent on said angle, said at least one first receiving sensor outputting a first signal, proportionate to said emissions, as a course measurement of said angle, c. Providing at least one second emitting source, to emit onto, or from said object, d. Providing at least one second receiving sensor, to receive emissions from said at least one second emitting source, either directly or indirectly, said emissions received dependent on said angle, said at least one second receiving sensor outputting a second signal, proportionate to said emissions, as a fine measurement of said angle, Wherein said first signal and said second signal are capable of being combined to determine said angle.

In yet another aspect the present invention consists in a method of sensing rotation using a rotational sensor having a plurality of first sensors to measure the absolute rotation of an object, and at least one second sensor to measure the relative rotation of said object, the method comprising or including the steps of, e. Receiving the sensor absolute angle signal from the first sensors, f. Receiving the sensor relative angle signal from the second sensors, g. Calculating a current absolute angle if not known, by setting this and a current derived angle to the sensor absolute angle, h. Calculating the current absolute angle, if not equal to the sensor absolute angle by setting this to be equal to the sensor absolute angle, and calculating a current offset error equal to the current absolute angle minus the current derived angle, i. If this error is zero then stepping to step i, j. If this error is not zero then calculating an angle adjustment equal to the minimum of a percentage of the sensor relative angle or the current offset error, k. Comparing the sign of the sensor relative angle and the current offset error, and
  i. If the sign is the same then calculating a new sensor relative angle equal to the sensor relative angle plus the angle adjustment, or
  ii. If the sign is not the same then calculating a new sensor relative angle equal to the sensor relative angle minus the angle adjustment, l. Calculating a new current offset error equal to the old current offset error minus the angle adjustment, m. Calculating a new current derived angle equal to the old current derived angle plus the sensor relative angle, Wherein the new current derived angle is then used as a signal, readout, display or similar of the actual rotational angle of said object.

Preferably the percentage is in a range of 10% to 90%.

Preferably the percentage is 50%.

Preferably said method is used in an endoscope simulator to provide a virtual readout of position and angle of an endoscope or facsimile thereof.

Preferably said first sensor is a light based sensor.

Preferably said second sensor is a light based sensor.

In yet another aspect the present invention consists in a system including a rotational sensor as herein described, using a method as herein described with reference to any one or more of the accompanying drawings.

In yet still another aspect the present invention consists in a rotational sensor as herein described with reference to any one or more of the accompanying drawings.

In a further aspect the present invention consists in method as herein described with reference to any one or more of the accompanying drawings.

In a further aspect still the present invention consists in a system as herein described with reference to any one or more of the accompanying drawings.

Further aspects of this invention which should be considered in all its novel aspects will become apparent from the following description given by way of example of a possible embodiment thereof.

Where in the foregoing description, reference has been made to specific components or integers of the invention having known equivalents then such equivalents are herein incorporated as if individually set forth.

As used herein the term "and/or" means "and" or "or", or both.

As used herein "(s)" following a noun means the plural and/or singular forms of the noun.

Unless the context clearly requires otherwise, throughout the description and the claims, the words "comprise", "comprising", and the like, are to be construed in an inclusive sense as opposed to an exclusive or exhaustive sense, that is to say, in the sense of "including but not limited to".

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE PREFERRED EMBODIMENT

Preferred embodiments will now be described with reference to FIGS. 1 through 7B.

Figure 1:
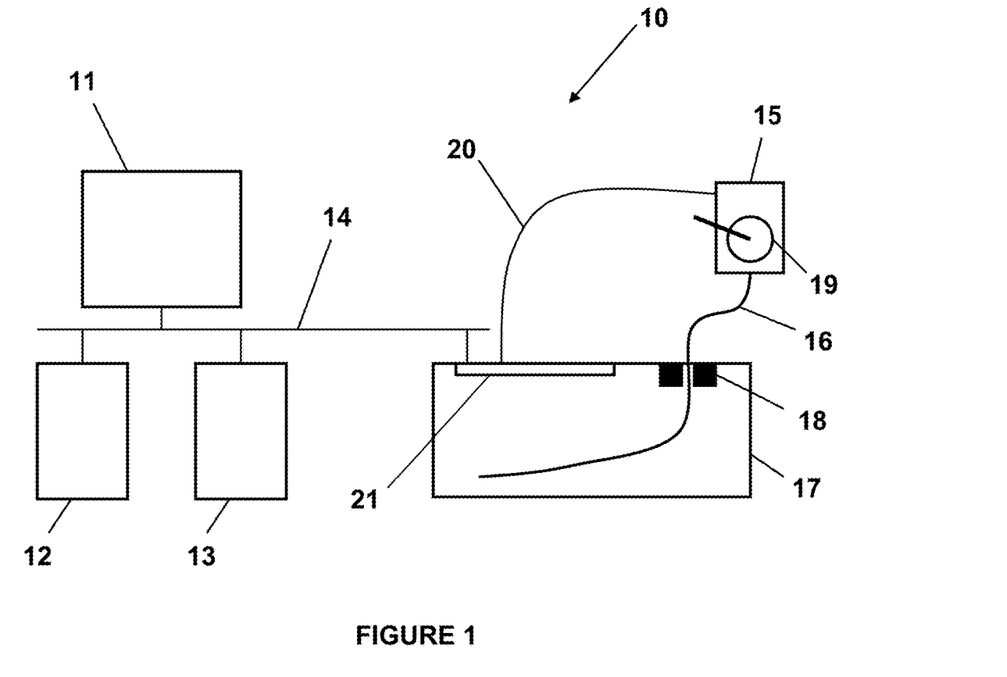
FIG. 1: is a schematic diagram of an example use of the present invention in an endoscope simulator.

FIG. 1 is a schematic diagram of a system 10, according to one embodiment (in this case an endoscopy simulator) that may use the present invention of a rotational sensor 18. System 10 includes display 11, processor 12, memory 13, bus 14, handset 15, tube (object) 16, housing 17, sensor 18, control 19 (as will be appreciated, multiple controls may be provided and positioned as desired), wire 20 and circuit 21.

Display 11, processor 12, memory 13 and bus 14 are preferably embodied by a conventional personal computer but purpose-built devices with more specific functionality are within the scope of the invention. Any display may be used such as monitors, projectors and viewing lenses adapted to provide images therethrough and mimic those used for real endoscopic procedures. While a single display is shown, any number of displays may be used to enable others to view the user's operation. The displayed images are preferably created by processor 12 using information stored in memory 13. Due to the virtual nature of the environment, parameters for additional/alternative environments may be obtained or generated as required, such as via the internet or any computer readable memory. Processor 12 may include or be couplable to a 3D graphics accelerator card to assist in displaying images. Bus 14 enables the transfer of data between display 11, processor 12 and memory 13.

The display 11 may show simply numbers of the current derived angle, or may show an image from which the operator can discern the angle, for example a virtual image of the orientation of the object 16.

Handset 15 is preferably configured to feel and operate in a similar manner to a genuine handset for an endoscope. Similarly, object 16 (in this instance a tube) is preferably selected to have structural properties (e.g., flexibility/rigidity, thickness, etc.) similar to that of a genuine tube for an endoscope. According to one embodiment, tube 16 is selectively couplable or engageable to handset 15 to enable different tubes to be used for different procedures so as to better mimic the actual equipment used for a particular procedure.

In operation, a user inserts the tip of object 16 into an opening in housing 17. The opening may be provided with a funnel to guide insertion. Alternatively, the wall of the opening may be configured to imitate an opening into which an endoscope may be inserted (e.g. a mouth/throat). Sensors 18 may be provided at the opening to monitor movement of object 16. Preferably, there is at least two sensors, course resolution sensor 18A and fine resolution sensor 18B (shown in FIG. 2) to monitor rotational movement of object 16 as it passes through the opening. There may also be further sensors (not shown) to measure translational movement of the object.

The invention relies on a fine resolution sensor 18B having a second emitting source 28 and a second receiving sensor 29 for fine measurement, and a course resolution sensor 18B having a first emitting source 22 and first receiving sensor 25 and analysis of the signals from these two sensors to determine the actual angle of the object 16. The second source and sensor measure fine movements of angle, and typically are relative in their measurement. That is, they have very fine resolution, but only report, movement by this much in a direction, they do not report relative to a baseline or zero measurement. The first source and sensor measure course movement in angle and report as a variation in angle from a baseline or known zero measuring.

The sensors rely on emission of light, magnetism or other property from their respective emission source. The source and sensors could be mounted separate to the object and rely on reflectivity from the object surface or other property. Alternatively one of either the sensor or source could be on the object and the other of the source or sensor could be mounted off the object. Also the first source/receivers could be of one such mounting (e.g. one on the object and one off the object) and the second source/receivers could be of the other such mounting (e.g. both off the object) or vice versa.

The use of the first and second sources and their respective sensors will be described herein as the sources being light based and the sensors receiving that light by reflection off the surface 23 of the object. A person skilled in the art will understand that alternative emissions could be used as described such magnetism, other radiation sources or other near field emissions that may be detectable and the invention should not be limited as such.

It is preferred the fine resolution sensor 18B is a laser-based sensor, the invention is not limited thereto. Where a laser-based sensor is used, it is preferably capable of tracking the tube rotation and displacement at a resolution of 2000 dpi.

The fine resolution sensor 18B used in one embodiment is preferably an infrared (or laser) sensor 18B of a type commonly used for computer mice. This second light receiving sensor 29, receiving light reflected from the object surface 23 from the second light emitting source 28 is able to report changes in position of an object in front of it in an X and Y axis. In the preferred form the source 28 and the sensor 29 are placed alongside the guides 61 which the object 16 runs through and reports fine resolution changes in rotation (by reading movement in one axis). It can also report changes in insertion (by reading changes in the other axis). In other embodiments, through less preferred the source 28 and sensor 29 are separate. These values are reported back to the software simulation. This fine resolution sensing is also relative to the position last time a change was reported, (potentially hundreds of times per second).

Figure 3:
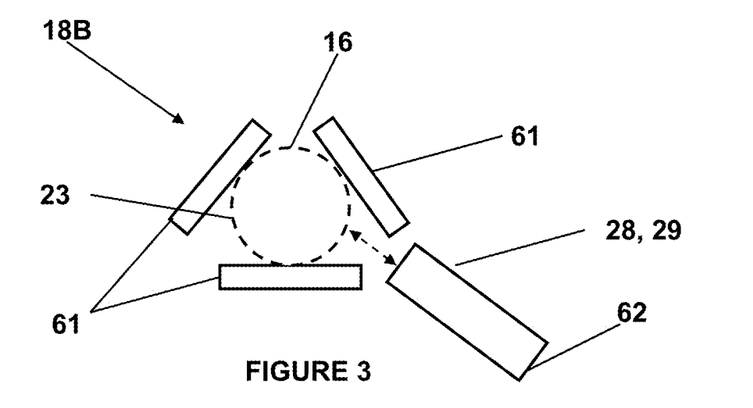
FIG. 3: is a schematic showing the locations of the fine resolution sensors.
Figure 4:
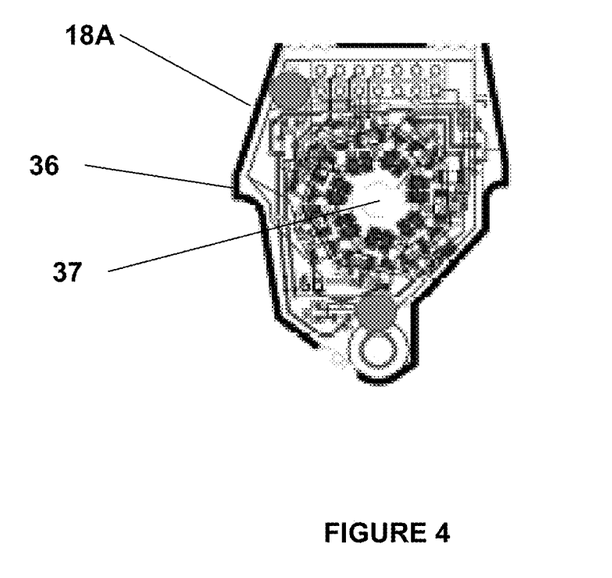
FIG. 4: is a printed circuit board containing the circular array of first light emitting sources and first light receiving sensors for course resolution sensing.

FIG. 3 shows a preferred arrangement for the fine resolution sensor 18B, including guides 61 and detector 62. Detector 62 is preferably the laser based sensor as discussed above and preferably incorporates a second light emitting source 28 and second light receiving sensor 29. In the embodiment shown these are incorporated in the one unit, however separate emitter and receiver may be used and still perform the same function. Guides 61 hold object 16 a fixed distance from detector 62 so that detector 62 is able to detect movement of tube 16 and the extent of movement thereof.

Detector 62 is preferably a fine laser as the second light emitting source 28 and is projected onto the object surface 23 upon which an optical sensor (second light receiving sensor 29) is focused. Consecutive images from the detector 62, preferably captured at a rate of 7000 pictures per second, are analysed to detect changes corresponding with movement of the object 16. Displacement values corresponding to rotational movement of the object are calculated in real time by a digital signal processor (DSP), preferably at a rate of 120 times per second and transmitted to processor 12 via USB or any other suitable interface so that the movement is reflected in the simulated display. The sensed displacement resolution is preferably at least 2000 dpi or 0.0127 mm.

A problem occurs when sensing the rotation of an object, for example a tube, that relates to compounding rotation errors due to rounding or minor sensor inaccuracies. Relative rotation changes can be sensed with a very high degree of accuracy but because these rotation changes happen so frequently any minor error builds into a very obvious absolute rotation error very quickly. To the user of for example the simulator system 10, this may present itself for example as them holding the handset 15 upright and the simulated view on the screen 11 showing the camera rotated by 90 degrees.

Sensors for determining absolute rotation instead could be used, but they have a comparatively very coarse granularity and so do not produce the smooth rotational movements required by the simulator.

This problem therefore is resolved by making use of both relative (fine) 18B and absolute (course) sensors 18A and combining the results to produce very smooth absolute rotational movement.

Therefore a course resolution sensor 18A is also used to act as a base measurement for the fine resolution sensor 18B. The relative locations in one preferred embodiment of 18A and 18B are shown in FIG. 3. This shows selected features of a preferred arrangement of housing 17 which may use rotational sensor 18. In this arrangement, funnel 71 is provided to aid insertion of the object 16 into housing 17 and through sensors 18A and 18B. Sensor 18A and 18B, or a separate, additional sensor, may be configured to monitor lengthwise movement of object 16.

Figure 2:
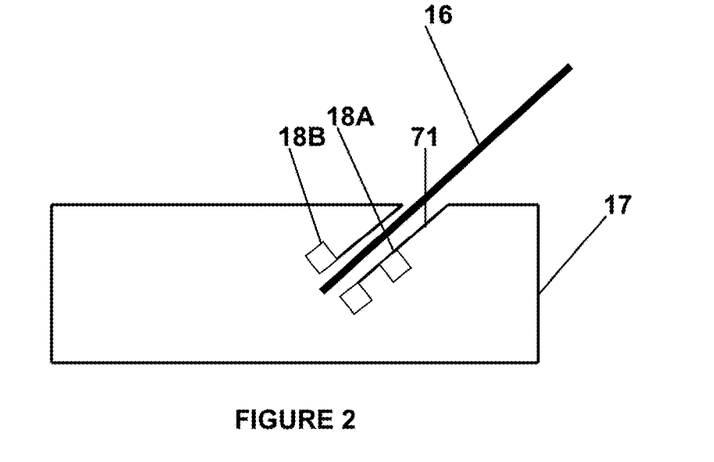
FIG. 2: is a side view of location of the sensors in one application, for an endoscopy simulator.

In the preferred embodiment the fine resolution sensor 18B is located before the course resolution sensor 18A, as shown in FIG. 2. The fine resolution sensor 18B is positioned about 1.5 cm down the guide path from the entrance or funnel 71. The course resolution sensor 18A is about 1 cm after that.

The course resolution sensor arrangement in one preferred embodiment is described with reference to FIGS. 4 through 6B. For the course resolution sensor 18A, a circuit board 36 is constructed with a hole 37 in the centre for the object 16 to pass through (shown in FIGS. 6A/6B). Arranged in an array about the hole 37 is at least one, and preferably a plurality, of first light emitting sources 22 and first light receiving sensors 25. Shown in FIGS. 6A and 6B in a preferable embodiment there are seven sources 22 and sensors 25. Persons skilled in the art will understand there may be more or less of these as necessary. The first light emitting source 22 in the preferred embodiment is a light emitting diode ("LED"), and emits some light at least in the infrared ("IR") spectrum. In the preferred embodiment substantially all the light is in the IR spectrum. The first receiving sensors 25 in the preferred embodiment are photo transistors. As shown in FIGS. 6A and 6B the sources 22 and sensors 25 are equally spaced around the hole 37. The photo transistors are optimized for IR light and are thus less sensitive to any ambient light which may enter the device. Between each pair of photo transistors is an IR LED 22 which is positioned and angled so that when the object 16 is present the light from a single LED 22 will reflect off the object surface 23 into a single photo transistor 25.

The object 16 in the preferred embodiment has a first emissive property over one arc of its surface as a stripe running the length of the object. The object also has a second emissive property over a remainder arc of the object. For example the first emissive property may be confined to constant a 90 degree arc down the length of the object, and the remaining object surface has the second emissive property on the remaining 270 degrees. The course sensor 18A second receiving sensor can pick the difference from each of these emissive properties to provide a course angle reading. The first emitting source and thus also the first and second emissive properties could also be an inherent material property of the object 16, such as reflectivity (possibly also from natural light), radiation, magnetism or other.

Figure 5:
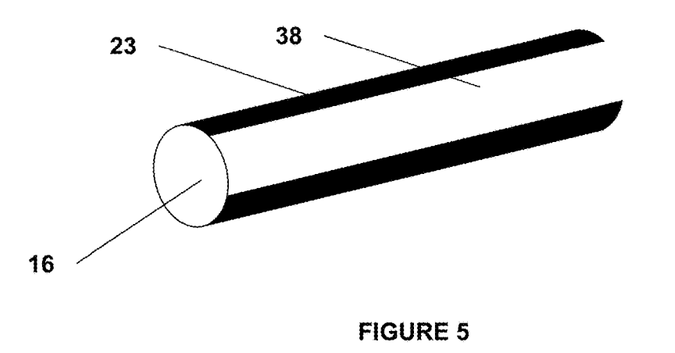
FIG. 5: shows in isometric view a length of object, in this case circular in nature, with a stripe along its longitudinal axis over 90 degrees of arc.
Figure 6:
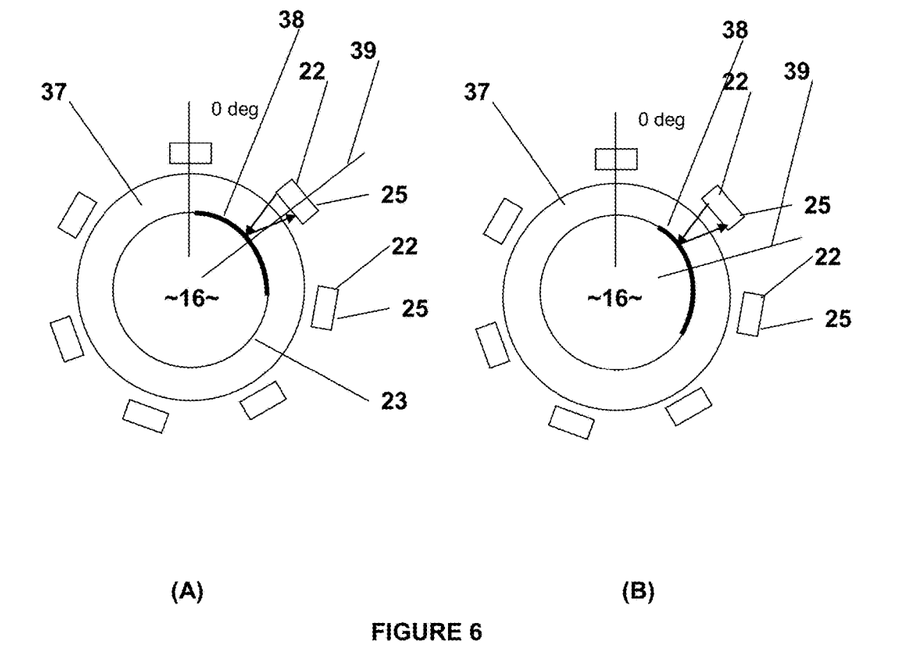
FIG. 6A: is a close up schematic of the first light sensing array (shown with 7 sensors) showing the object in cross-section, with the stripe across an odd (3) number of sensors, and therefore the angle sensed.
FIG. 6B: is a close up schematic of the first light sensing array (shown with 7 sensors) showing the object in cross-section, with the stripe across an even (2) number of sensors, and therefore the angle sensed.

In one embodiment using light based emission and sensing the object presents surface 23 which is predominantly of one colour and has a stripe 38 running down the longitudinal axis, of a contrasting colour as shown in FIG. 5. In the preferred embodiment the surface 23 is predominantly black and the stripe 38 is white. The stripe 38 in the preferred embodiment covers the same arc over the length of the object 16 this is it that starts and finishes on the same angles all the way along the object 16. The stripe 38 is preferably one quarter of the circumference of the object 16. However in other embodiments the stripe and sheath may be of different colours, normally contrasting and the stripe 38 may cover a different angle, so long as this is known. The contrast is important so the sensors can pick up the change from one colour to the other.

Each photo transistor 25 as stated is calibrated separately to account for the variance in sensitively between individual sensors. Due to this variance in sensitively only "primarily black" or "primarily white" are checked for, rather than attempting to detect various shades which may be present as the edge of the stripe 38 passes the sensor.

When the object 16 passes through the hole 37 in the circuit board 36, a number of adjacent sensors 25 will report they are primarily seeing the stripe 38, as shown in FIGS. 6A and 6B. Seen in FIG. 6A an odd number of sensors 25 one, two and three are seeing the stripe 38 (counted clock wise from the zero degree line). In FIG. 6B an even number of sensors two and three are seeing the strip 38.

Based on which sensors 25 are primarily seeing the stripe 38 along the object 16, the firmware in the device will calculate and report the sensor absolute angle 39 (FIG. 6A) of the stripe 38. If an odd number of sensors 25 (as in FIG. 6A) are able to see the stripe 38 then the angle 39 is reported as the angle which relates to the middle sensor which is able to see it. In this instance the middle sensor 25 is number two and for an array of seven sensors this is at approximately 50 degrees (360 degrees divided by 7 (the number of sensors)).

In FIG. 6B there is an even number of sensors 25, sensors two and three able to see the stripe 38. The angle 39 therefore is reported as the angle between the middle pair of sensor able to see it, in this case 75 degrees. This gives a total of 14 possible absolute angles which can be reported, approximately 25 degrees apart, for a 7 sensor array.

Because it may be possible for light to travel around the edge of the object 16 and cause a sensor 25 to falsely report that it is seeing the stripe 38, sensors 25 along with their corresponding LED 22 may be turned on in rapid succession, either individually or in groups to avoid "false positive" results. If all of the sensors 25 report that they are able to see the strip 38 at the same time then the system it is assumes the object is not inserted and each sensor 25 is actually seeing light from other LEDs 22.

Figure 7:
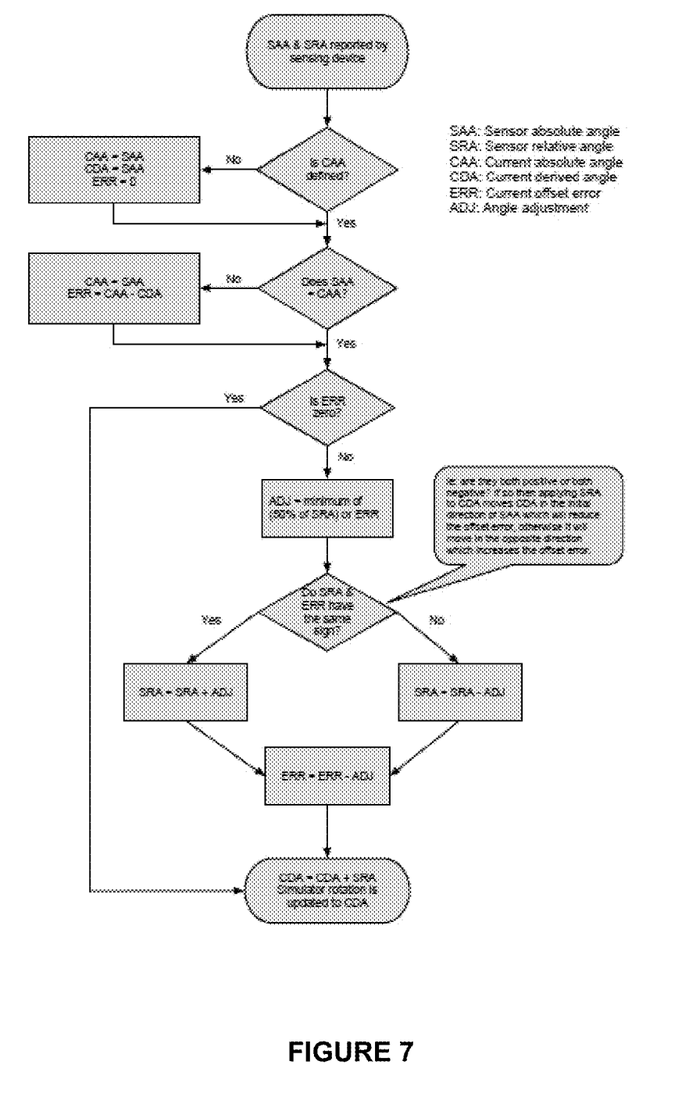
FIG. 7: is a flow chart of the method of the present invention used to analyse the outputs from the light based sensors.

Referring to FIG. 7 the analysis method of reducing the error between the actual angle of the object and the sensed or displayed angle will now be described. The outputs from the rotational sensor 18 (comprising fine sensor 18B and course sensor 18A) are passed via bus 14 or other communication link to the processor 12. Contained in the processor 12 (there may be more than one) is software that runs the algorithm.

The software retrieves the course resolution sensor 18A (course) signal and the fine resolution sensor 18B (relative) from the sensor 18 as the sensor absolute angle and sensor relative angle respectively as shown in FIG. 7.

The software then uses these to determine the current derived angle as shown in FIG. 7 and explained below.

When a new sensor absolute angle is reported, that is, different to the previous sensor absolute angle reported by the sensing device 18 from sensors 18B, the software records this as the "current absolute angle". The current absolute angle is compared to the current derived angle and a "current offset error" is calculated, being the signed difference between the current absolute angle and the current derived angle.

The software then tries to drive this error to zero by adjusting any relative movements toward the direction indicated by this error amount. Alternatively if the current offset error is zero then the software immediately calculates a new current derived angle as described shortly.

Each time a relative movement is reported by the fine sensor 18A as a new sensor relative angle, this sensor relative angle will have an angle adjustment applied as the minimum of a percentage adjusted sensor relative angle, or the current offset error (this value of percentage can be adjusted to tune how quickly errors are resolved). In the preferred embodiment this percentage may be in the range of 1% to 99%, but is preferably in the range of 10% to 90%. In the preferred embodiment this percentage is 50%.

A check is made to see whether the sensor relative angle and the angle adjustment have the same sign, that is both positive, or both negative, or have a differing sign, that is negative and positive.

If they are the same sign then the sensor relative angle is increased by adding the angle adjustment because it is in favour of the current offset error (that is, turning toward the current absolute angle). If they are of differing sign then the sensor relative angle is decreased by subtracting the angle adjustment percentage because it is turning away from the current absolute angle.

The adjustment to the relative reported angle change will never be more than the current offset error so that the derived angle doesn't overshoot the current absolute angle.

Each time an adjustment is made to derive a new or adjusted sensor relative angle relative change the current offset error is also reduced by this same amount (that is the angle adjustment), and when this error amount reaches zero then no more adjustments will be made to the relative rotational movement.

The current derived angle is then updated from the old current derived angle plus the sensor relative angle and the display 11 (or other output using the angle) is updated accordingly.

Whenever the current absolute angle reported by the sensing device changes a new current offset error is calculated and the process starts again, even if the previous offset error had not yet been resolved. In this way the simulated bronchoscope always rotates in the direction indicated by the user, but is always "pulled" in the direction of the current absolute angle reported by the device avoiding any compounding rotation errors due to rounding or minor sensor inaccuracies.

Although this invention has been described by way of example and with reference to possible embodiments thereof, it is to be understood that modifications or improvements may be made thereto without departing from the scope or spirit of the invention as defined in the appended claims.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A rotational sensor to sense an angle of an object, comprising:
   a) a plurality of first emitting sources, to either emit onto, or from said object:
   b) a plurality of first receiving sensors, to each receive emissions from a corresponding one of said plurality of first emitting sources, either directly or indirectly, said emissions received dependent on said angle, each of said first receiving sensors outputting a first signal, proportionate to said emissions, as a course measurement of said angle, wherein said plurality of first emitting sources and said plurality of first receiving sensors are arranged in a substantially circular array, through which said object can pass:
   c) at least one second emitting source, to emit onto, or from said object,
   d) at least one second receiving sensor, to receive emissions from said at least one second emitting source, either directly or indirectly, said emissions received dependent on said angle, said at least one second receiving sensor outputting a second signal, proportionate to said emissions from said at least one second emitting source, as a fine measurement of said angle, wherein said first signal and said second signal are capable of being combined to determine said angle;
   wherein said first emitting source illuminates at least part of a surface of said object and said first receiving source receives said illumination as a reflection from said surface.

2. The rotational sensor of claim 1, wherein said at least one first emitting source and said at least one first receiving sensor measure absolute rotation of said object.

3. The rotational sensor of claim 1, wherein said at least one second emitting source, and said at least one second receiving sensor measure relative rotation of said object.

4. The rotational sensor of claim 1, wherein said rotational sensor has a course measurement resolution of 360 degrees divided by twice the number of said first receiving sensors.

5. The rotational sensor of claim 1, wherein there are between two and fifteen first receiving sensors.

6. The rotational sensor of claim 1, wherein there is a one to one matching of a said first emitting source to a said first receiving sensor.

7. The rotational sensor of claim 6, wherein a first emissive property over said one surface arc runs as a stripe of said first emissive property in a longitudinal direction along said object.

8. The rotational sensor of claim 7, wherein said stripe is continuous over said one surface arc and has substantially the same beginning and end angle along said object.

9. The rotational sensor of claim 7, wherein said stripe of said first emissive property is over substantially a 90 degree arc of said surface.

10. The rotational sensor of claim 1, wherein said object has a substantially constant external shape along its length.

11. The rotational sensor of claim 10, wherein said object has an outward presenting or visible surface comprised primarily of two colors, one color over one arc of said surface as said stripe, and the other color over the remainder arc of said surface.

12. The rotational sensor of claim 1, wherein said sensor can detect said object having a first emissive property over one surface arc of said object, and a second emissive property over a remainder surface arc of said object, because of said at least one first emitting source, said first and second emissive properties detectable by said at least one first receiving sensor.

13. The rotational sensor of claim 1, wherein said first receiving sensor receives light from said first emitting source, either indirectly as a reflection or directly as an emission.

14. The rotational sensor of claim 1, wherein said second receiving sensor receives light from said second emitting source, either indirectly as a reflection or directly as an emission.

15. The rotational sensor of claim 1, wherein said second emitting source illuminates at least part of a surface of said object and said second receiving source receives said illumination as a reflection from said surface.

16. The rotational sensor of claim 1, wherein said at least one first emitting source emits in the infra-red spectrum.

17. The rotational sensor of claim 1, wherein said at least one second emitting source is a laser based light emitting source.

18. The rotational sensor of claim 1, wherein said at least one second receiving sensor has a resolution in excess of 1,000 dots per inch.

19. The rotational sensor of claim 1, wherein said at least one second receiving sensor has a resolution of 2,000 dots per inch.

20. A method of sensing an angle of an object comprising:
   a) providing a plurality of first emitting sources, to either emit onto, or from said object;
   b) providing a plurality of first receiving sensors, to each receive emissions from a corresponding one of said plurality of first emitting sources, either directly or indirectly, said emissions received dependent on said angle, each of said first receiving sensors outputting a first signal, proportionate to said emissions, as a course measurement of said angle, wherein said plurality of first emitting sources and said plurality of first receiving sensors and first emitting sources are arranged in a substantially circular array distributed uniformly about a central axis, through which said object can pass, wherein the first emitting sources are oriented to emit light toward the central axis and wherein the first receiving sensors are oriented to receive light reflected away from the central axis by the object;
   c) providing at least one second emitting source, to emit onto, or from said object;

d) providing at least one second receiving sensor, to receive emissions from said at least one second emitting source, either directly or indirectly, said emissions received dependent on said angle, said at least one second receiving sensor outputting a second signal, proportionate to said emissions from said at least one second emitting source, as a fine measurement of said angle, wherein said first signal and said second signal are capable of being combined to determine said angle.

21. A method of sensing rotation using a rotational sensor having a plurality of first sensors to measure the absolute rotation of an object, and at least one second sensor to measure the relative rotation of said object, comprising:

a) receiving the sensor absolute angle signal from the first sensors;

b) receiving the sensor relative angle signal from the second sensors;

c) calculating a current absolute angle if not known, by setting this and a current derived angle to the sensor absolute angle;

d) calculating the current absolute angle, if not equal to the sensor absolute angle by setting this to be equal to the sensor absolute angle, and calculating a current offset error equal to the current absolute angle minus the current derived angle;

e) if this error is zero then stepping to step i;

f) if this error is not zero then calculating an angle adjustment equal to the minimum of a percentage of the sensor relative angle or the current offset error;

g) comparing the sign of the sensor relative angle and the current offset error;

h) if the sign is the same then calculating a new sensor relative angle equal to the sensor relative angle plus the angle adjustment or if the sign is not the same then calculating a new sensor relative angle equal to the sensor relative angle minus the angle adjustment, calculating a new current offset error equal to the old current offset error minus the angle adjustment; and i) calculating a new current derived angle equal to the old current derived angle plus the sensor relative angle, wherein the new current derived angle is then used as a signal, readout, display or similar of the actual rotational angle of said object.

22. The method of claim 21, wherein the percentage is in a range of 10% to 90%.

23. The method of claim 21, wherein the percentage is 50%.

24. The method of claim 21, wherein said first sensor is a light based sensor.

25. The method of claim 21, wherein said second sensor is a light based sensor.

* * * * *

UNITED STATES PATENT AND TRADEMARK OFFICE
CERTIFICATE OF CORRECTION

PATENT NO. : 9,664,538 B2  Page 1 of 1
APPLICATION NO. : 14/355540
DATED : May 30, 2017
INVENTOR(S) : Berwyn Lee Hoyt et al.

It is certified that error appears in the above-identified patent and that said Letters Patent is hereby corrected as shown below:

In the Claims

In Column 13, Line 28, Claim 1, the ":" should be a ";".

In Column 13, Line 38, Claim 1, the ":" should be a ";".

In Column 13, Line 40, Claim 1, remove the "," and insert therefor --; and--.

In Column 13, Line 49, Claim 1, add --and-- after the ";".

In Column 14, Line 67, Claim 20, add --and-- after the ";".

Signed and Sealed this
First Day of August, 2017

Joseph Matal
*Performing the Functions and Duties of the*
*Under Secretary of Commerce for Intellectual Property and*
*Director of the United States Patent and Trademark Office*